Sept. 18, 1934. A. C. GAYNOR Re. 19,316

ATTACHMENT PLUG RECEPTACLE

Original Filed July 9, 1927

Inventor

A. C. Gaynor,

By Church & Church

Attorneys

Reissued Sept. 18, 1934

Re. 19,316

UNITED STATES PATENT OFFICE 19,316

ATTACHMENT-PLUG RECEPTACLE

Arthur C. Gaynor, Stratford, Conn.

Original No. 1,719,363, dated July 2, 1929, Serial No. 204,601, July 9, 1927. Application for reissue June 29, 1931, Serial No. 547,760

6 Claims. (Cl. 173—330)

My invention relates to improvements in attachment plug receptacles.

The chief object of my invention is to provide an attachment plug receptacle, which can be manufactured and assembled more economically and easily than those of the corresponding type heretofore made. A further object of my invention is to provide an attachment plug receptacle, of the duplex type, having a contact strip which can be manufactured very cheaply and simply. A further object of my invention is to provide an attachment plug receptacle having a receptacle-supporting yoke fastened thereto independently of the means for maintaining the contacts in housed position within the body of said receptacle.

Further objects, and objects relating to details and economies of construction and operation will definitely appear from the detailed description to follow. In one instance, I accomplish the objects of my invention by the devices and means set forth in the following specification. My invention is clearly defined and pointed out in the appended claims. One embodiment of my invention is illustrated in the accompanying drawing, forming a part of this specification, in which:

In the drawing, the same reference numerals refer to the same parts throughout the several views and the sectional view is taken looking in the direction of the arrows at the ends of the section line.

Figure 1:
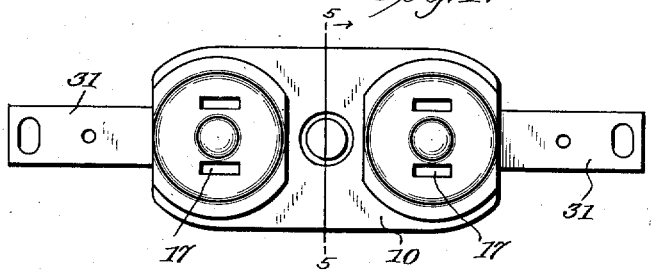
Figure 1 is a plan view of an attachment plug receptacle, of the duplex type, embodying my invention.
Figure 2:
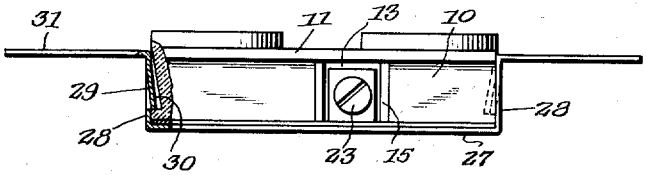
Fig. 2 is a view of the receptacle in side elevation, a portion of one end of the receptacle body and the supporting yoke being broken away to show the connection between the two.

I have illustrated my invention embodied in an attachment plug receptacle of the duplex type and comprising a body 10 of insulating material provided with the overhanging ledges 11 at each side of the upper face. The main portion of the body is provided with two longitudinally extending slots 13, which open from the lower face thereof and which are enlarged at opposite ends to form the contact-receiving chambers 14. The side walls of the body are cut away to form the side openings 15, which communicate with the slots 13, and receive the terminal portions of the contact strips. The receptacle body is also recessed at 16, opposite said side openings. The upper face of the body 10 is pierced, at 17, to provide blade guideways communicating with the contact chambers 14.

Figure 3:
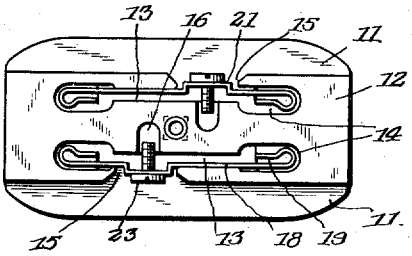
Fig. 3 is a bottom plan view of the receptacle, with the supporting yoke and the sheet of insulation removed.
Figure 4:
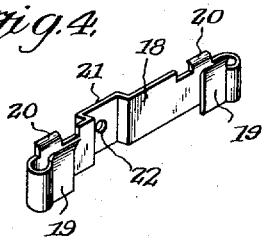
Fig. 4 is a perspective view of one of the contact strips.
Figure 5:
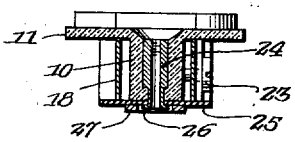
Fig. 5 is a detail, sectional view taken on the line 5—5 of Fig. 1.

Two contact strips 18 are housed in the slots 13 and chambers 14, as illustrated in Fig. 3. Opposite ends of the strip 18 are bent back upon themselves, at 19, to form the contact fingers, which are adapted to receive the blades of the plugs to be inserted in this receptacle. Upwardly projecting and outwardly bent ears 20 are provided on the upper edges of the contact strip, as shown in Fig. 4, and these ears contact with the upper walls of the contact chambers 14, adjacent the edges of the entrance slots 17. The strip 18 is offset at 21, near the center thereof, to form a terminal portion which is provided with a tapped hole 22, to receive the terminal screw 23. The contact strips are inserted in position from the lower face of the insulating body and, when in position, the offset terminal portions 21 are located in the side openings 15, so that such terminal portions are exposed at the side of the receptacle. The terminal screws 23 may extend into the recesses 16, which are formed to accommodate them.

A tubular rivet 24 is inserted in a central bore in the body of the receptacle, the upper end of this rivet being internally screw-threaded to receive a screw for attaching an escutcheon plate. A sheet 25, of insulating material, is applied to the lower face of the receptacle body and closes the slots 13 and contact chambers 14. This sheet of insulation is secured in place by upsetting or spinning over the lower end of the rivet 24, as at 26. A receptacle supporting yoke is provided, having a lower portion 27 underlying the sheet of insulation, and end portions 28, engaging the ends of the receptacle body, and the attaching ears 31, extending from each end thereof, in the usual manner. This supporting yoke is secured to the receptacle body, independently of the means for supporting the contacts in position, by means of tongues 29, which are struck inwardly from the end portions 28 and engage recesses 30 formed in the end walls of the receptacle body.

It will be observed that the body of the receptacle is of comparatively simple construction and can be manufactured very cheaply, and that the contact strip is one which may be made out of sheet metal at a very low expense. The offset portion 21 is exposed through the side opening 15, and provides a place at which the wires can be connected to the contact strips with great facility.

I am aware that the particular construction disclosed in this specification may be varied considerably without departing from the spirit of my invention and, therefore, I claim my invention broadly as indicated by the appended claims.

What I claim is:

1. An attachment plug receptacle comprising a body of insulating material recessed from its lower face to provide a pair of longitudinally extending contact-receiving slots and pierced from its upper face to provide guideways communicating with the end portions of such slots, the walls of said body being cut away to form side openings communicating with said slots near the centers thereof, strips disposed on their edges in said slots with their end portions forming blade-engaging contacts and offset near their centers to form terminal portions located in said side openings, terminal screws carried by said offset portions, and means for retaining said strips in position in said slots.

2. An attachment plug receptacle comprising a body of insulating material recessed from its lower face to provide a pair of longitudinally extending contact-receiving slots and pierced from its upper face to provide guideways communicating with the end portions of such slots, the side walls of said body being cut away to form side openings communicating with said slots near the centers thereof and said body being recessed opposite said side openings, strips disposed on their edges in said slots with their end portions forming blade-engaging contacts and offset near their centers to form terminal portions located in said side openings, terminal screws carried by said offset portions and projecting into said recesses, and means for retaining said strips in position in said slots.

3. An attachment plug receptacle comprising a body of insulating material recessed from its lower face to provide a pair of longitudinally extending contact-receiving slots enlarged at opposite ends to form contact chambers, said body being pierced from its upper face to provide guideways communicating with said chambers, and the side walls of said body being cut away to form side openings communicating with said slots near the centers thereof, strips disposed on their edges in said slots with their end portions forming blade-engaging contacts and offset near their centers to form terminal portions located in said side openings, terminal screws carried by said offset portions, and means for retaining said strips in position in said slots.

4. An attachment plug receptacle comprising a body of insulating material recessed from its lower face to provide a pair of longitudinally extending contact-receiving slots enlarged at opposite ends to form contact chambers, the upper face of said body being pierced to provide guideways communicating with said chambers, the side walls of said body being cut away to form side openings communicating with said slots near the centers thereof, contact strips disposed on their edges in said slots and having their end portions bent to form blade-engaging contacts and offset near their centers to form terminal portions located in said side openings, terminal screws carried by said offset portions, a sheet of insulation underlying said body and closing said chambers, means for fastening said sheet to said body to support said strips in position, a receptacle-supporting yoke underlying said sheet of insulation, and means for securing said yoke to the body independently of the means for supporting said contacts in position.

5. An attachment plug receptacle comprising a body of insulating material, metal strips disposed on their edges in slots in said body and having at their ends blade-engaging contacts, the body being pierced from its face to provide guideways through which attachment plug blades may pass to engage said contacts, the side walls of the body being cut away to form side openings near the center of the body, one at each side thereof, the metal strips having on the flat sides thereof offset portions near their centers lying parallel with said slots to form terminal portions located in said side openings and means to maintain the contacts in the body.

6. A duplex attachment plug receptacle comprising an oblong body of insulating material having near each side wall a longitudinally extending contact-receiving slot, said body being pierced from its upper face to provide guideways communicating with the ends of the contact-receiving slots, metal strips disposed on edges, one in each of said slots, and each having blade-engaging contacts on its ends located below said guideways, each side wall of the body being provided with an opening through which a portion of the adjacent strip which is parallel with said slot is exposed and accessible from the side of the body, terminal screws carried by said exposed portions of said strips and extending transversely of the body and means to maintain the contacts in the body.

ARTHUR C. GAYNOR.